J. Powell,
Basin Faucet.

No. 801. Reissued Aug. 23, 1859.

Witnesses
Geo. W. Davis, Jr.
Thomas Hile

Inventor
James Powell

N. PETERS, PHOTO-LITHOGRAPHER, WASHINGTON, D. C.

UNITED STATES PATENT OFFICE.

JAMES POWELL, OF CINCINNATI, OHIO.

IMPROVEMENT IN FAUCETS.

Specification forming part of Letters Patent No. 23,310, dated March 22, 1859; Reissue No. 753, dated July 5, 1859; Reissue No. 801, dated August 23, 1859.

*To all whom it may concern:*

Be it known that I, JAMES POWELL, of Cincinnati, in the county of Hamilton and State of Ohio, have invented a new and useful Improvement in Faucets; and I hereby declare the following to be a full and exact description thereof, reference being had to the accompanying drawings, making part of this specification.

The said invention relates to that class of valve cocks in which an eccentric on the operating-stem is employed to move the valve to and from its seat.

In order to insure the accurate seating of the valve and avoid any abrasive action between it and its seat, it is of especial importance in such faucets to preserve the valve-stem from any lateral motion. For this purpose it has been common to construct the valve-stem with a yoke having its bearing-points connected by bands encircling the cam and a sufficient distance apart to permit the partial or entire rotation of the cam between them without causing deviation from a rectilinear path. This is disadvantageous in various respects, chiefly from the difficulty of inserting and removing a valve-stem having so great breadth of head.

The object of my invention is to so construct and operate the valve-stem that it may be confined to a strictly rectilinear path, permit the complete rotation of the operating-cam, and at the same time be destitute of such protuberance upon its head as to necessitate undue enlargement of the water-way to permit the passage of the valve-stem through it in putting the faucet together or taking it apart.

Figure 1:
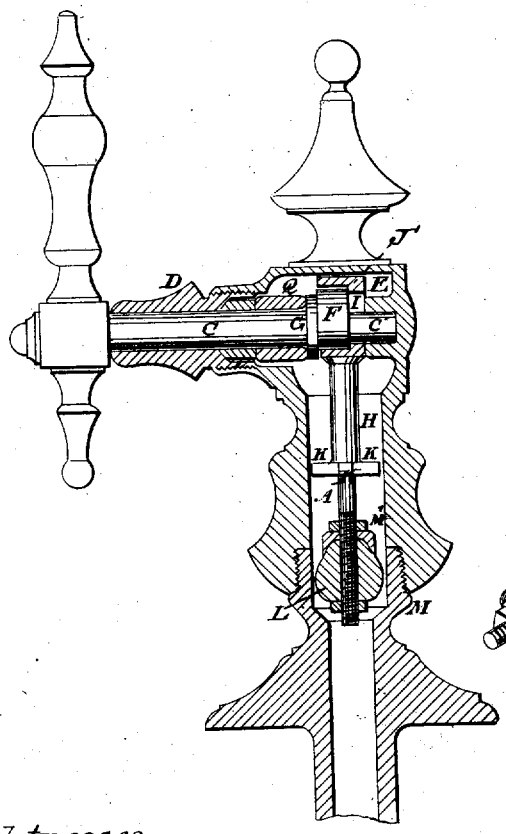
Figure 1:
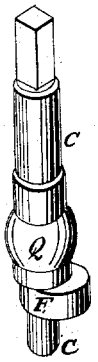
Figure 2:
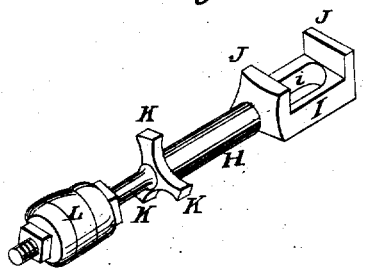

In the accompanying drawings, Figure 1 is an axial section of a basin-cock embodying my improvements, the plane of section being parallel with the operating-stem, and some of the parts being shown in elevation. Fig. 2 is a perspective view of the operating-stem and the valve-stem detached.

A is the valve-chamber. C is the operating-stem, constructed with a circular cam, F, and collar G, and terminating in a pivot, *c*, which occupies a step or socket, E, in the wall of the faucet. The stem C is confined in position and leakage around it prevented by the means described in my patent of December 21, 1858, a gum cushion, Q, being interposed between the collar G and a loose collar, R, which latter is fitted to the cap D by a ground joint.

The valve-stem H has a flattened head, I, which flattened portion is slotted longitudinally, *i*, so as to receive the pivot *c* of the stem C, which is thus made effective to prevent the displacement of the head I in two directions, while it is held in the other two directions by being confined, as shown, between the socket E and cam F. The longitudinal motion necessary to open and close the valve is imparted to the valve-stem through the medium of two flanges, J and J′, on its head I, engaging on each side with the cam F. K K K are spurs or projections on the valve-stem H, which serve to confine it to an accurately central position within the chamber A and guide the valve to its seat in the act of closing.

The valve L is of india-rubber, and is adjustable on its stem by means of a pair of screw nuts or collars, M M′, which supply the place of the customary nut and fast collar.

This valve-cock can be made at a much less expense than those now in use, is less liable to derangement, and is easily repaired without detaching from the supply-pipe.

The valve is operated with great facility, the cam having no stop pins or other restriction to its sweep, nor any one arbitrary point it must assume in order to close or open the passage, the cock being effectually closed at any point of one-third of the rotation of the cam-stem and effectually opened at any point of the other two-thirds of its circuit. The peculiar arrangement of the operative parts dispenses with the necessity of spring, connecting-screws, or pins to hold the valve-stem in position. The cam, being confined at its periphery only by the yoke which it touches at two opposite points, can be easily withdrawn for inspection, cleansing, or repair of the cock. It works with the least possible friction, and the form and dimensions of the yoke are such as permit its ready insertions and withdrawal through the water-way and involve no unsightly swelling of the chamber at this part.

The adjustable shoulders M M′ enable the valve to be set up as it wears, so as to dispense with the necessity of a new plug, and the parts do not require to be made with the mechanical precision which is necessary when one shoulder of the plug or valve is a fixture.

It will be evident that this arrangement is equally applicable to valves closing either in the direction of the current or against it, and in either case the closing of the valve is so gradual as to avoid injurious concussion and reaction.

The spurs K will evidently operate with equal effect, whether located above or below the valve, a slight elongation of the lower end of the valve-stem being needful in the latter case. It is not absolutely essential that the said spurs should be attached to the valve-stem. If preferred, they may constitute or be replaced by a bridge through which the valve-stem is adapted to slide.

It will be evident that this invention is equally applicable to various other descriptions of faucets, such as are known as "stop-cocks," "bib-cocks," &c.

I am aware that it is common to operate a faucet-valve by means of an eccentric and yoke, and also that valve-stems when so operated have been guided in a rectilinear path; but I know of no instance in which these results have been accomplished with a valve-stem adapted to be inserted or withdrawn through the water-way without undue enlargement of the same and to permit the complete rotation of the operating-cam.

I claim as new and of my invention and desire to secure by Letters Patent—

1. The valve-stem H, formed with projecting flanges J and J′, when confined to a rectilinear path and operated by a cam or eccentric which engages with it at two opposite points, in the manner and for the purpose set forth.

2. The described arrangement and combination of the slotted head I *i*, pivot *c*, socket E, and cam F, operating in the manner set forth to prevent lateral motion of the valve-stem.

In testimony of which invention I hereunto set my hand.

JAMES POWELL.

Witnesses:
OCTS. KNIGHT,
A. V. GRAY.